Figure 1:
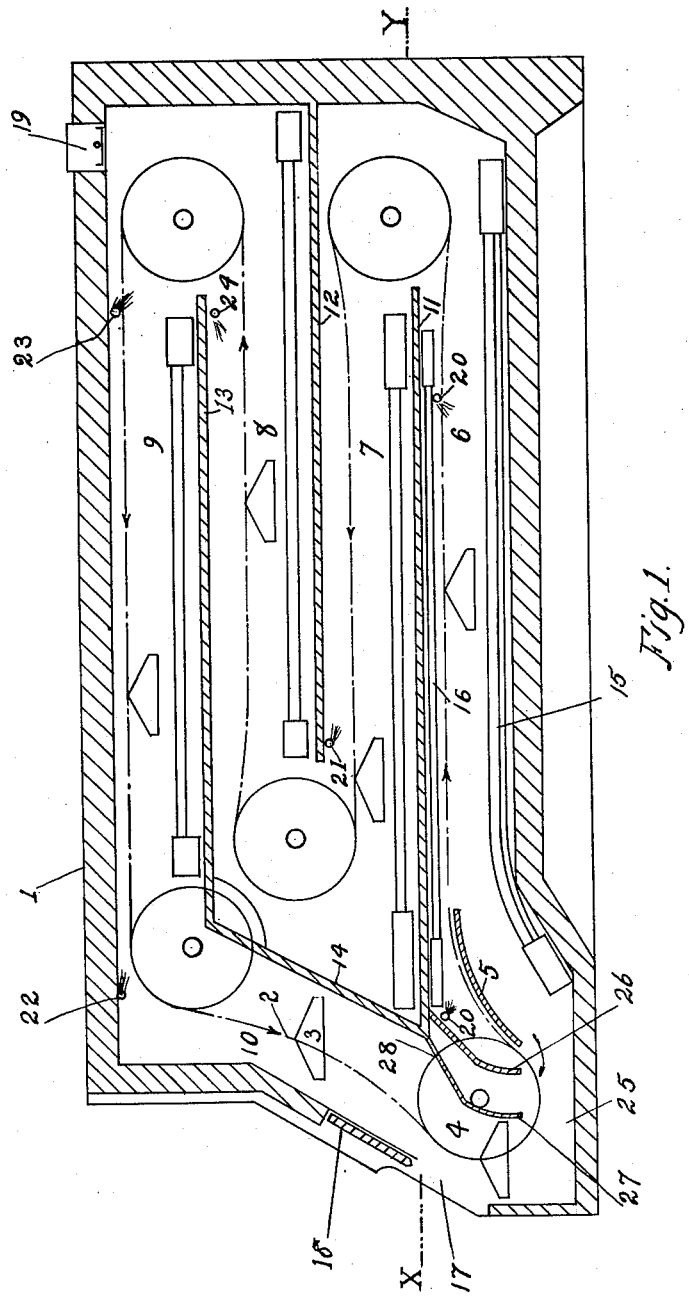

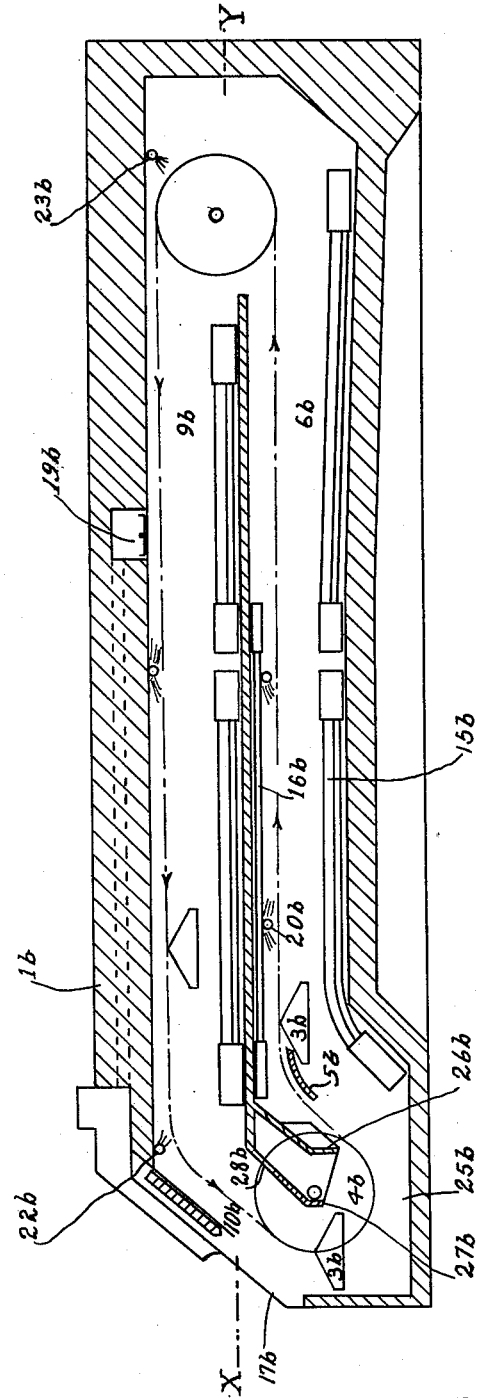

Patented Aug. 25, 1936

2,052,060

UNITED STATES PATENT OFFICE 2,052,060

BAKE OVEN

Ezra F. Sperling, Saginaw, Mich., assignor to Baker Perkins Company, Inc., Saginaw, Mich., a corporation of New York Application June 19, 1933, Serial No. 676,481

6 Claims. (Cl. 107—57)

This invention relates to multiple pass traveling tray ovens for baking bread and the like. These ovens have a slow moving conveyor equipped to carry suspended trays of dough that follow one another so closely as to form a continuous line of material when the oven is in operation. There are pulleys over which the conveyor runs, changing its course through the oven along circuitous paths in multiple passes, back and forth and up and down. The passes are defined by top and bottom partitions and upright baffles. Heat is supplied by suitable heating elements and humidity by steam jets. The oven receives the dough pieces and discharges the baked loaves through the same opening.

My invention pertains more particularly to improvements that enable such traveling tray ovens to produce with perfection certain kinds of baked loaves which heretofore they have not been able to make satisfactorily; twist loaves, New England compact loaves, multiple piece loaves, and similar goods.

Multiple pass traveling tray ovens could not produce that type of loaf satisfactorily because the oven design and mode of operation constrained them to always introduce the dough pieces initially into a steam laden atmosphere, whereas goods of that type must be baked by subjecting the dough pieces as they enter the oven to the action of top radiant heat in an atmosphere nearly or quite devoid of steam, keeping them subjected to that relatively hot dry atmosphere until the loaves begin to take on a delicate bloom, and finally subjecting them to a steam-laden atmosphere until baking is completed.

The trade has long been confronted by the problem how to construct a multiple pass traveling tray oven that shall be capable of initially dry-heating the dough pieces so as to produce loaves of the class now under consideration, with the known high rate of production and the economy of floor space and of fuel attained in those ovens when baking the classes of goods to which they have heretofore been devoted.

Peel ovens and tunnel type traveling plate ovens were formerly used exclusively to produce those loaves at their best, being designed and constructed to treat dough pieces in a hot dry atmosphere initially, and then in a steam-laden atmosphere.

An object of this invention is to produce means for establishing and maintaining, at will, the initial hot dry atmosphere in the lowermost pass of a multiple pass tray oven, and a directional travel of the conveyor appropriate to deliver dough pieces promptly from the charging station into the lowermost pass, while keeping them from being unduly heated before entering it, then retaining the goods in the hot dry atmosphere of the lowest pass until the desired bloom appears, and finally conveying them into a steam-laden atmosphere that is maintained in the upper regions of the oven to complete the baking. The best results, heretofore attainable only in peel ovens and traveling plate ovens, can thus be duplicated in traveling tray ovens.

Another object is to provide means by which the lowest pass may be kept full of steam whenever desired, instead of being filled with the above mentioned hot dry atmosphere, so the oven can be used to bake goods that require full-steam treatment in all passes.

A further object is to provide safety means for venting excess steam-laden atmosphere out through the upper part only of the charging and discharging opening, allowing practically none to escape through the lower part, so as to avoid danger of scalding the operator's arms by steam while loading and unloading loaves through the lower part.

With the foregoing and certain other objects in view which will appear later in the specifications, my invention comprises the devices described and claimed and the equivalents thereof.

In the drawings Fig. 1 is a diagrammatic view showing in vertical longitudinal section an oven embodying my invention in its preferred form.

Figure 2:
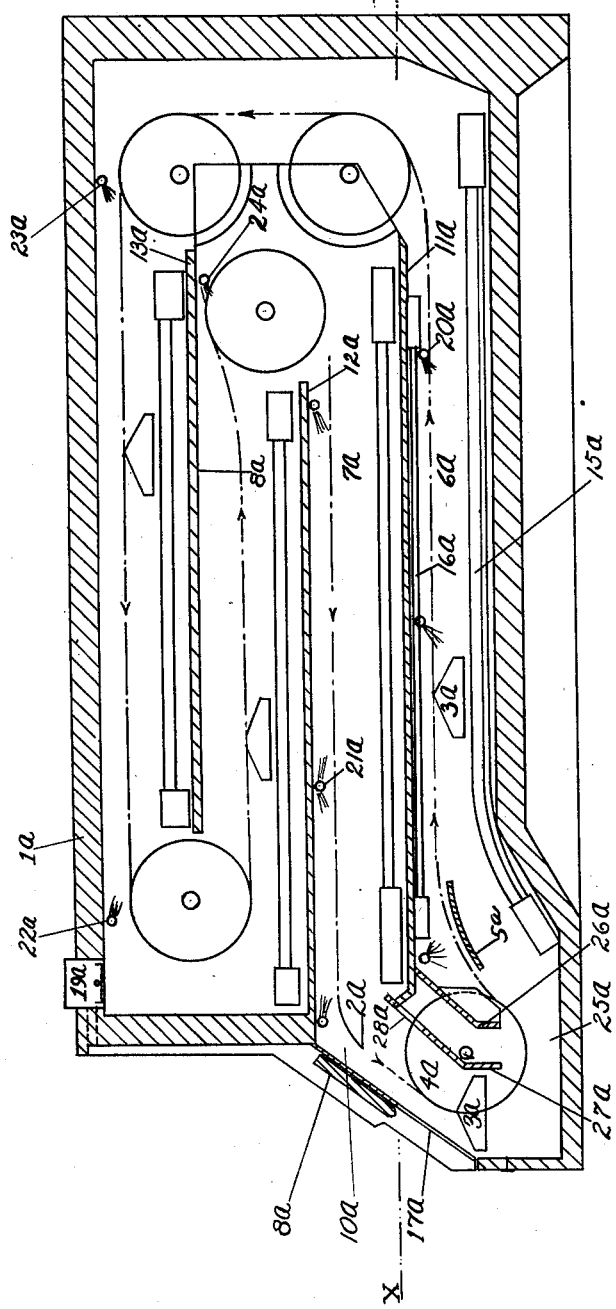

Figs. 2 and 3 are similar views of modified forms, the latter showing an oven with two superimposed passes.

Referring to Fig. 1, the housing 1 contains the slow moving conveyor 2 with its suspended trays 3. Pulleys 4 and guides 5 constitute guiding means to change the course of the conveyor through the oven along circuitous paths in multiple passes 6, 7, 8, 9, 10. Partitions 11, 12, 13 and upright baffle 14 define the various passes.

Heating elements, such as radiators 15, are provided in lowermost pass 6 below the conveyor, for applying bottom heat to the dough pieces, and radiator 16 provides additional top heat. The heating elements are supplied with hot gas from suitable sources, in known manner.

An opening 17 is located preferably in the front wall of the housing at a height convenient to the operator, for charging proved dough pieces and for unloading baked loaves from the passing trays, the top portion of the opening being located substantially in the plane of the top partition 11 of the lowermost pass 6. Opening 17 can be closed or adjusted by a door 18. Steam dampers 19 are provided in the roof of the housing for quickly clearing the oven of hot gases, as when changing from one kind of baking to another, or to assist in controlling the quality of the oven atmosphere while baking certain types of loaves that require to be semi-steamed.

There are injection means such as steam nozzles or humidifying devices 20 spaced apart at suitable distances along the lowermost pass 6, and others, 21, 22, 23, 24, in the upper passes, capable of being directed so as to discharge steam either rearwardly or forwardly along their respective passes to maintain a steam-laden atmosphere in regions of the oven above the partition 11.

Successive nozzles in the same pass can be directed to discharge toward each other, that is, in opposition, or both in the same direction. Directional control of the steam from the jets is thus provided for checking, controlling or baffling the normal tendency of the hot gases to flow with considerable speed through the successive passes toward opening 17, that is, in the direction of the travel of the conveyor.

In the bottom of housing 1 near the opening 17 is a depression 25. Front pulleys 4 and conveyor guides 5 may be located in it so that dough pieces are moved from the charging station at 17 downwardly below the bottom of the lowermost pass 6, rearwardly and then upwardly along guide 5, entering pass 6 from below.

A baffle 26 extends across the end of the first pass 6 adjacent the opening 17 and downwardly at least to the level of the bottom of the exposed portions of dough pieces on the trays in the pass 6. Its lower end is preferably about level with the floor of the pass. The function of baffle 26 is to partition off the front end of pass 6 from the rest of the oven, although allowing excess gases from pass 6 to escape underneath its bottom edge toward the opening.

A similar baffle 27 is spaced forwardly of the baffle 26. Baffle 27 presents a vent opening 28 at its upper part adjacent the horizontal top partition 11 of pass 6. The function of baffle 27 is to guide all of the gases that have escaped from pass 6 by flowing underneath baffle 26, upwardly through the intake channel defined by baffles 26 and 27, and thence out through vent opening 28 into pass 10 at a point substantially abreast of the upper part of charging opening 17.

In its general application my improved traveling tray oven is capable of baking perfectly either bread or cake dough to produce goods designated in the trade as full-steam, semi-steam, or special loaves.

Full-steam loaves are baked by immersing the dough pieces in a hot steam-laden atmosphere promptly after they are placed on the conveyor at the charging door and keeping them subjected to the action of a steam-laden atmosphere all the way through the various passes of the oven including the final pass 10 that returns them to the unloading station at the opening 17. Traveling tray ovens are extensively used for baking full-steam loaves.

Semi-steam loaves are braked by introducing the dough pieces quickly into a steamy atmosphere in the bottom pass, subjecting them to steam in the intermediate passes 7, 8 and finally subjecting them to a dry hot atmosphere in the horizontal top pass 9 and the downward delivery pass 10. Semi-steam loaves are also quite generally baked in traveling tray ovens.

Special loaves, such as twist loaves, New England compact loaves, multiple piece loaves and other goods of similar character are made by introducing the dough pieces first into a dry hot atmosphere in the lowermost pass 6, as distinguished from the initial steam-laden atmosphere employed in making the full-steam and semi-steam loaves, and then passing them through a final steam-laden atmosphere in all subsequent passes 7, 8, 9, 10.

The traveling tray type of oven is adapted by my invention to bake these special loaves successfully.

The mode of operation of the oven for producing each class of loaves will now be described with reference to the structure of Fig. 1.

For full-steam loaf production the oven is heated by elements 15 assisted, if the operator desires, by top heat radiator 16 in the lowest pass 6. The oven having attained baking temperature, steam jets 20 are opened and such others as may be needed. The steam, being lighter than air of corresponding temperature, tends to rise into the upper regions of the oven, displacing the heated air which goes down through pass 10 and spills out through the upper part of opening 17.

The upper regions of the oven being filled with steam, a steam ceiling tends to establish itself throughout the oven at about the level of the top of opening 17. Its location is indicated approximately by line X—Y. After the steam ceiling has been established any additional steam which is injected into the lowermost pass will tend to rise from pass 6 at the back of the oven into those oven spaces which are higher than the upper edge of opening 17, that is to say, they enter the next higher pass, 7, displacing some of the steam in passes 8, 9 and pushing it downwardly in pass 10 to the steam ceiling, whence it flows out through the top part of opening 17. There is a resultant tendency to create drafts in the oven. If that tendency were not checked the effect would be that room air would be drawn in through the lower part of the charging door 17 and then move downwardly and rearwardly into the lowermost pass 6 in sufficient quantity to undesirably cool and dilute the steam atmosphere in that pass and perhaps also in the upper passes.

To stop such flow a back pressure is created in one or more of the passes by directing some or all of the steam jets 20 to 24 counter to the natural draft. The upward draft tendency is thus nullified and pass 6 is kept filled with steam-laden atmosphere, notwithstanding that the normal steam ceiling lies at the top of opening 17, that is, along line X—Y.

The number of jets to be used and their capacity and direction appropriate to prevent any undesirable flow toward the right in lowermost pass 6 during the baking operation is determined by the operator.

In practice, the jet adjustments are made so that a small amount of steam atmospere is constantly being displaced from pass 6 toward the left, indicated by the arrow in Fig. 1, passing beneath the edge of baffle 26 to insure that the pass 6 shall be kept completely filled with steam whenever it is desired to bake full-steam loaves. The flow of displaced gas is upward in the passageway between baffles 26 and 27, out through opening 28 at the top of baffle 27, thence across the downward pass 10 and out through the upper part of opening 17.

An equivalent amount of room air comes into the oven through the lower part of opening 17 and passes downwardly under the lower edge of baffle 27 where it mixes with the escaping gases from pass 6. This localized stream of incoming room air surrounds the freshly charged dough pieces while they are being conveyed from the charging station at the lower part of opening 17 downwardly and underneath the pulley 4. The conveyor then rises out of depression 25, entering pass 6 from below at guide 5. The dough pieces are then carried up into the hot steam atmosphere of the lowermost pass.

Since the steam that escapes forwardly from pass 6 must pass under the edge of baffle 26 the body of steam itself will present a barricade that halts the incoming stream of room air and compels it to take the upward passage between baffles 26 and 27.

The full-steam loaves, having been immersed in a steam-laden atmosphere during their entire travel through the principal passes of the oven come down through pass 10, still enveloped in steam, and are removed through the cool lower part of opening 17.

To bake semi-steam loaves the dough pieces must be initially introduced into a steam-laden atmosphere as was the case when baking full-steam loaves. They must then be carried through an atmosphere that contains more or less steam and finally move through a hot dry finishing atmosphere. The operation of the oven when baking semi-steam loaves is as follows:

Lowermost pass 6 is kept filled with steam by properly adjusting the directional flow of the jets 20 in the manner above described for full-steam baking. The intermediate passes 7 and 8 are also filled with steam, either by permitting some to escape from pass 6 up into passes 7 and 8, or by operating the steam jets in those passes, or both.

Top pass 9 is kept practically void of steam by shutting off jet 22 and directing jets 23 rearwardly, or to the right in Fig. 1, to prevent any considerable amount of steam from entering top pass 9 by way of pass 8. Heating elements 15 can then maintain a hot dry atmosphere in top pass 9 and likewise in the front downward pass 10.

In this use of the oven any excess steam atmosphere that accumulates in the passes 7, 8 may be bled before it reaches the pass 9 by opening steam damper 19.

Special loaves, as New England compact, twist loaves, or multiple piece loaves require a still different oven adjustment and mode of operation. It has been noted that for such goods the proofed dough pieces must be introduced initially into a dry hot atmosphere and be finished in a steam-laden atmosphere. Therefore, bottom pass 6 must be kept substantially free from steam in order to give the loaves proper "bloom" before they are conveyed to the finishing atmosphere. To do that pass 6 is heated to baking temperature by means of heating elements 15 below the trays 3 for bottom heat and by elements 16 above the trays for top heat. The steam jets 20 in the bottom pass are shut off. Upper passes 7, 8, 9 may be filled with steam from jets 21, 22, 23, 24, but in some cases, as where baking is continued for a sufficient length of time, all of the steam necessary to these upper passes may be given off by the loaves themselves.

The hot dry atmosphere in bottom pass 6 is confined at the front by baffle 26 and being heavier than the steam atmosphere in the upper passes, does not tend to rise rearwardly into pass 7 when the upper passes are filled with steam. A normal steam ceiling is held approximately at the line X—Y by regulating the back pressure as was described for full-steam baking. For the kind of baking now under discussion it is not absolutely necessary to employ baffles 26 and 27, but I prefer to use them for producing all varieties of goods.

If the baker inadvertently increases the steam atmosphere in the upper passes so as to exert too much back pressure on pass 6, tending to drive its hot dry atmosphere under baffle 26, then baffle 27 intercepts it and directs it through opening 28 at a point substantially level with the upper part of opening 17. The lower part of the opening 17 is kept free of hot gases and safe for the attendant while charging dough pieces and removing baked loaves.

Fig. 2 shows a modified arrangement of the passes and baffles, the numerals designating the parts corresponding to those of Fig. 1, the suffix —a— indicating the type of oven shown in Fig. 2; likewise in the further modified form, Fig. 3, the suffix —b— is applied to the numerals used in Fig. 1, to indicate corresponding parts.

In Fig. 2 the conveyor travel is downward from the charging door, rearward through the lowermost pass and then upward to the top pass, and finally by back and forth travel to the discharge opening. The damper-controlled steam vent 19a is preferably located at the top of the oven near the front; this being a point correspondingly near the discharge opening 17, as damper 19 is in Fig. 1.

In Fig. 3 the improvement is shown as applied to a traveling tray oven having only two superimposed passes. In this case the steam vent 19b is preferably located in the top of the oven about midway of its length.

In the appended claims I have pointed out the essential elements of my invention, it being understood, however, that the claims are not intended to be limited to the form of the parts illustrated and described further than a limitation to the described form is necessary to distinguish them from the prior art.

Having thus described my invention, what I claim and desire to secure by Letters Patent is:

1. In a bake oven including a plurality of superimposed passes connected in a circuit defined by partitions, the oven having a charging and unloading opening whose top portion is located substantially in the plane of the top partition of the lowermost pass, and a tray conveyor for carrying dough pieces from the charging opening downwardly and rearwardly into said pass, heating elements arranged above and below the path of travel of the trays through said pass, steam supply nozzles in said lowermost pass, steam supply nozzles in said upper passes, the nozzles in the back part of the top pass being directed rearwardly and constituting means for preventing any considerable amount of steam-laden atmosphere entering the top pass from the lower passes, and venting means located in the oven wall adjacent the rearward part of the top pass, and spaced baffles at the intake end of the lowermost pass presenting an uptake channel adapted to convey gases upwardly from the tray level in the lowermost pass and discharge the same at a point abreast of the upper part of said charging opening.

2. In a bake oven including a plurality of superimposed passes connected in a circuit defined by partitions, the oven having a charging and unloading opening whose top portion is located substantially in the plane of the top partition of the lowermost pass, and a tray conveyor for carrying dough pieces from the charging opening downwardly and rearwardly into said pass, heating elements arranged above and below the path of travel of the trays through said pass, steam supply nozzles in said lowermost pass, steam supply nozzles in said upper passes, a baffle extending across the forward end of the lowermost pass adjacent said charging opening and downwardly at least to the level of the bottom of trays in said lowermost pass, a second baffle spaced forwardly of said first mentioned baffle and arranged to present a vent opening at its upper part substantially abreast of the upper part of the charging opening, said spaced baffles presenting an uptake for room air entering the oven through the lower part of the charging opening and also for gases discharged from the lowermost pass beneath the first-mentioned baffle.

3. In a bake oven having multiple passes superimposed and arranged in continuous series and having a charging and discharging opening and a conveyor for carrying dough pieces successively through said passes, said oven also having a depression adjacent the charging opening, a downwardly extending baffle at the end of the lowermost pass adjacent said opening, guiding means for said conveyor to direct it from the opening downwardly, rearwardly under said baffle, then upwardly into said lowermost pass, an uptake for receiving gases that escape from the lowermost pass underneath the edge of the baffle and directing them upwardly to discharge at a point in the oven abreast of the top portion of said charging opening, the arrangement being such that room air coming into the oven through the lower part of the charging opening is prevented from entering the lowermost pass and is discharged out of the oven through the upper part only of the charging opening along with any excess gases from the lowermost pass and any gas that is displaced from the upper passes.

4. In a multiple pass traveling tray oven, a lowermost pass provided with heating elements and humidifying devices, a pair of baffles spaced apart to provide an uptake extending across the oven from side to side and located abreast the charging opening of the oven, the lower end of said uptake being at or below the level of the bottom of trays in the lowermost pass, the uptake having a vent near its upper end located substantially opposite the upper part of the charging opening, said uptake serving to intercept any flow of room air tending to enter the lowermost pass and also to intercept gases discharged from the said pass toward the opening.

5. In a bake oven including a plurality of superimposed passes connected in a circuit defined by partitions, the oven having an opening for charging, unloading and venting, whose top portion is located substantially in the plane of the top partition of the lowermost pass, a tray conveyor for carrying dough pieces from the charging opening downwardly and rearwardly into said pass, and means for maintaining a steam-laden atmosphere in regions of the oven above the said partition, said oven having in combination a baffle extending across the end of the lowermost pass adjacent said charging opening, and having its upper edge joined to the said top partition of the said pass, said baffle extending downwardly at least to the level of the bottom of the trays in the lowermost pass, heating elements in said pass, and a second baffle spaced forwardly of said first baffle and arranged to present a vent opening adjacent its top substantially abreast of the upper part of the charging opening.

6. In a bake oven including a plurality of superimposed passes connected in circuits defined by partitions, the oven having a charging and unloading opening whose top partition is located substantially in the plane of the top partition of the lowermost pass, and a tray conveyor for carrying dough pieces from the said charging opening downwardly and rearwardly into said pass, in combination, means for establishing at will a hot dry atmosphere in the lowermost pass including heating elements located above the path of tray travel in said pass, means for creating and maintaining a steam-laden atmosphere in regions of the oven above said plane consisting of steam injectors adapted and arranged to cause back pressure at the rearward end of the lowermost pass sufficient to keep therein the hot dry atmosphere, and means for driving said conveyor at a rate appropriate to keep dough pieces in said hot dry atmosphere until a desirable bloom appears, said conveyor being arranged to deliver dough pieces into and through the steam-laden atmosphere of the upper regions of the oven.

EZRA F. SPERLING.